(12) United States Patent
Dow

(10) Patent No.: US 9,699,494 B2
(45) Date of Patent: Jul. 4, 2017

(54) MULTIPLE CONTACT AND/OR SENSE PROMOTIONAL SYSTEMS AND METHODS

(71) Applicant: EL MEDIA HOLDINGS USA, LLC, Phoeniz, AZ (US)

(72) Inventor: Chris Dow, New River, AZ (US)

(73) Assignee: EL MEDIA HOLDINGS USA, LLC, Phoenix, AZ (US)

( * ) Notice: Subject to any disclaimer, the term of this patent is extended or adjusted under 35 U.S.C. 154(b) by 214 days.

(21) Appl. No.: 14/334,856

(22) Filed: Jul. 18, 2014

(65) Prior Publication Data

US 2015/0026574 A1    Jan. 22, 2015

Related U.S. Application Data

(60) Provisional application No. 61/856,249, filed on Jul. 19, 2013.

(51) Int. Cl.
| | |
|---|---|
| *H04N 21/43* | (2011.01) |
| *H04N 21/414* | (2011.01) |
| *H04N 21/45* | (2011.01) |
| *H04N 21/462* | (2011.01) |
| *H04N 21/61* | (2011.01) |
| *G06Q 30/02* | (2012.01) |
| *G06F 9/44* | (2006.01) |
| *G06F 13/38* | (2006.01) |

(52) U.S. Cl.
CPC ..... *H04N 21/41415* (2013.01); *G06F 9/4443* (2013.01); *G06F 13/385* (2013.01); *G06Q 30/0267* (2013.01); *H04N 21/4307* (2013.01); *H04N 21/4524* (2013.01); *H04N 21/4622* (2013.01); *H04N 21/6181* (2013.01)

(58) Field of Classification Search
CPC ........... G06Q 30/0267; H04N 21/4307; H04N 21/4524; H04N 21/41415; H04N 21/4622; H04N 21/6181
See application file for complete search history.

(56) References Cited

U.S. PATENT DOCUMENTS

| | | | |
|---|---|---|---|
| 7,889,964 B1 | 2/2011 | Barton et al. | |
| 8,255,547 B2 | 8/2012 | Schlacht et al. | |
| 2010/0205630 A1* | 8/2010 | Okamoto | G01C 21/26 725/32 |
| 2010/0241494 A1* | 9/2010 | Kumar | G06Q 20/204 705/14.1 |
| 2011/0185168 A1 | 7/2011 | Schlacht et al. | |
| 2012/0069131 A1 | 3/2012 | Abelow | |
| 2012/0236201 A1 | 9/2012 | Larsen et al. | |
| 2012/0311623 A1 | 12/2012 | Davis et al. | |

(Continued)

OTHER PUBLICATIONS

Notification of Transmittal of the International Search Report and the Written Opinion of the International Searching Authority for International Application No. PCT/US2014/047148 mailed Nov. 6, 2014 (10 pages).

*Primary Examiner* — Ricky Chin

(74) *Attorney, Agent, or Firm* — Mark Miller

(57) ABSTRACT

Various embodiments that may generally relate to presentation of content in a coordinated manner through a plurality of output devices is described. A smartphone, for example, may enhance a visual presentation made by a digital billboard by adding audio to the presentation. Various methods are described. Various apparatus are described. Further embodiments are described.

11 Claims, 9 Drawing Sheets

(56) References Cited

U.S. PATENT DOCUMENTS

| | | | |
|---|---|---|---|
| 2014/0022454 A1* | 1/2014 | Oh | H04N 5/04 348/515 |
| 2014/0039788 A1* | 2/2014 | Fuehrer | G06Q 30/0241 701/400 |
| 2015/0325090 A1* | 11/2015 | Heubel | G06F 3/0421 455/414.1 |

* cited by examiner

MULTIPLE CONTACT AND/OR SENSE PROMOTIONAL SYSTEMS AND METHODS

CROSS REFERENCE TO RELATED APPLICATIONS

This application claims benefit of U.S. Provisional App. No. 61/856,249, filed Jul. 19, 2013, which is incorporated herein by reference.

U.S. application Ser. No. 11/621,369 entitled "System for managing promotion", U.S. application Ser. No. 11/567,322 entitled "Method and apparatus for advertising on a mobile gaming device", and U.S. application Ser. No. 12/147,005 also entitled "Method and apparatus for advertising on a mobile gaming device", and U.S. application Ser. No. 12/56,619 entitled "Optical systems and elements with projection stabilization and interactivity" are all hereby incorporated herein by reference.

FIELD

Some embodiments may generally relate to advertising and/or integration of multiple output device into a presentation.

BACKGROUND

Display devices, such as billboards, televisions, digital signs, and so on may be viewed by individuals. Mobile devices, such as cellular telephones, PDAs, notebook computers, smartcars, smart watches, and so on may be proximate to individuals.

SUMMARY

The following should be understood as example embodiments, and not as claims. A.

DETAILED DESCRIPTION

I. Example Embodiments

Figure 1A:
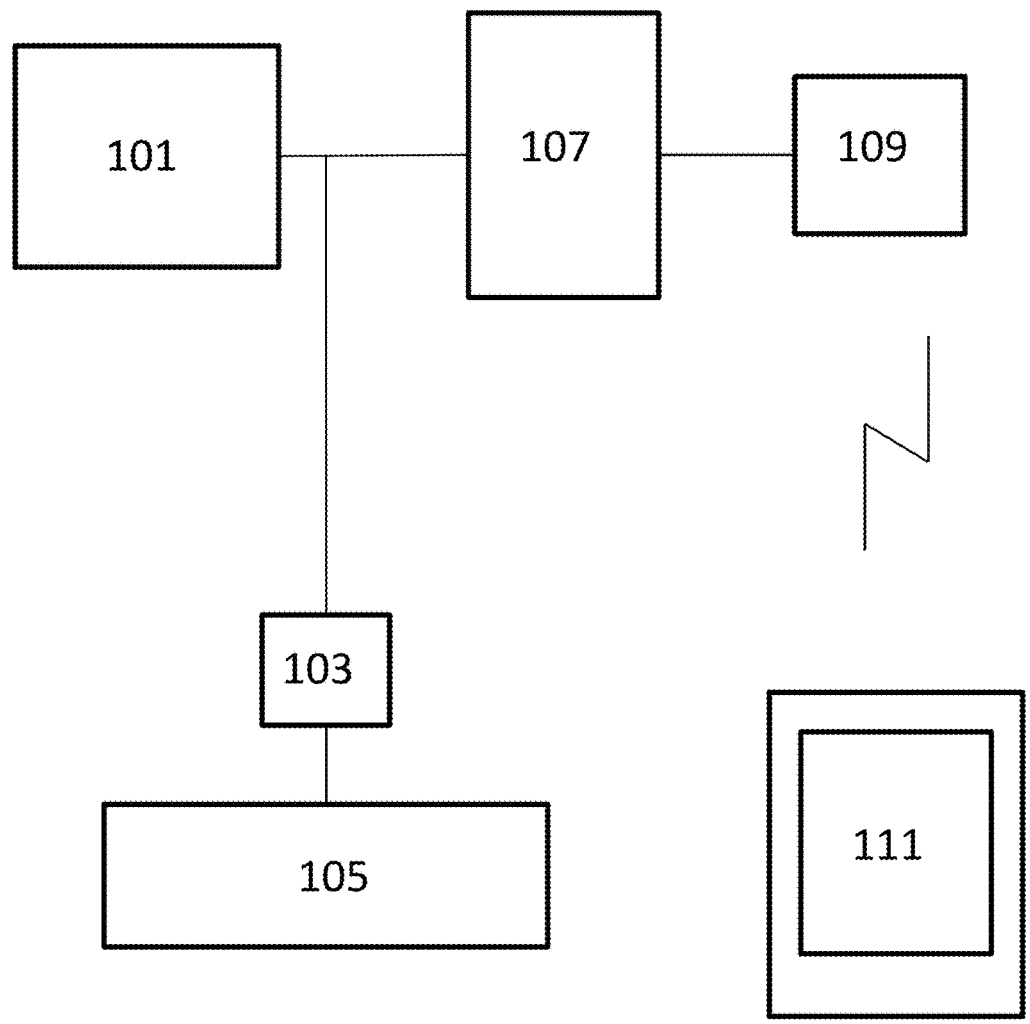
FIGS. 1a and 1b illustrate some example systems that may be used in some embodiments

A variety of display elements surround us in many different environments. For example, in Times Square one is surrounded by a dazzling array of digital billboards, conventional billboards, computer displays, televisions, and so on. Those display elements taken together or separately provide an opportunity to display content and/or advertising to viewers. However, those same elements may have no or limited ability to reach beyond visual presentations. By combining one or more display elements with a device capable of providing enhancements to a visual display, traditional content from such elements may be enhanced. For example, a user's cell phone may be turned into a speaker device so that audio from a digital billboard may be heard locally by an observer. Many other examples of potential interactions, methods, and systems are described herein.

Some embodiments may include one or more display devices. Such devices may act together or separately. Such devices may include digital display devices that transmit visual information through an LED, LCD and/or other display technology. One example display device is the digital display device at Harmon Corner in Las Vegas. In some embodiments, display device components and/or control equipment may be obtained from Panasonic of Osaka, Japan and/or YESCO of Salt Lake City, Utah. Another example display device is the NASDAQ sign in Times Square. In some embodiments, a display device may include a digital billboard. Such a billboard may have no or limited sound capabilities (e.g., to abide by local noise ordinances). In other embodiments, a digital device may have full and/or robust audio capabilities.

It should be recognized that display devises have been described in terms of billboards and/or public space displays, that those examples are non-limiting. A display device may include for example, a seat back display in a car, airplane, boat, etc.; a television such as in an airport, a gym, a sports bar, etc.; any digital display in any context, a neon sign, any moving display device in any context, any stationary display device in any context; and/or any display device desired. It should be further recognized that while display devices have been described in the context of electronic devices, that such examples are non-limiting. A display device for example may take the form of a traditional billboard, a side of a building turned into a display, a water surface made to move in a pattern, a surface of any type in any context whether continuous or non-continuous, whether mobile or stationary that is used to make a presentation, and so on.

It should be recognized that while various display devices have been described, that such devices are given as non-limiting examples only and that some embodiments may include one or more display devices in any combination as desired.

A device that enhances a display may include advice remote from a display device, such as a portable electronic device. Such a portable device may include, for example, a cellular telephone (e.g., a smartphone, an android phone, an iPhone, a windows phone), a laptop computer, a smart vehicle, an automobile, a smart watch, wearable electronics (e.g., google glass), and so on. Enhancement devices may include devices that may have the ability to provide one or more sensory outputs. For example, an enhancement device may be able to play audio (e.g., through a speaker phone element of a smartphone, through headphones attached to a cell phone, through stereo speakers in a car, etc.), an enhancement device may be able to provide haptic feedback (e.g., a vibration feature of a mobile phone, a vibration or tightening feature of a smartwatch, a pinching or shock feature of a wearable device, etc.), an enhancement device may be able to provide a visual (e.g., using an augmented reality overlay of a glasses devices, using a display element of a portable device, using a projector element of an electronic device, etc.), an enhancement device may be able to provide taste or smell feedback (e.g., via a digital taste interface, via a digital scent technology, etc.), and so on in any combination.

It should be recognized that while examples of devices are given, that those examples are non-limiting and that some embodiments may include any desired one or more enhancement devices in any combination.

By combining the functionality of one or more display devices and one or more enhancement devices, content may be presented in a more robust manner. For example, a speaker in a phone may provide the audio for a television in a public space, a haptic device in a wristband may provide a vibration for a display on a digital billboard, and so on. Any combination of display devices and enhancement devices may be used to create a combined presentation of content as desired. Various examples of such presentations and related systems and/or methods are provided herein.

It should be recognized that while examples are given in terms of an enhancement device adding to a display device's presentation that such examples are given as non-limiting examples. For examples, in some embodiments, instead of a display device, an audio device (e.g., a speaker) and a haptic device (e.g., a vibrating floor) may be enhanced with a display feature on a mobile device. As another example, in some embodiments, a scent device (e.g., a scent emitting device) may be enhanced with a visual feature of an augmented reality glasses device, a haptic feature of a smart watch and an audio feature of a smartphone.

It should be recognized that one or more enhancement device and/or one or more primary presentation device may work together in any combination. Such combinations may be duplicative (e.g., a video enhancement of a video primary). Such combinations may require all elements or may allow fewer than all elements to operate (e.g., if a customer does not have or desire haptic, then haptic may not be used but other features may be used).

The Kanye West Paradigm

In 2013, Kanye West released an album using a viral marketing campaign. In a variety of locations, Kanye's face was displayed (e.g., on billboards and/or building sides). Speakers nearby played music from the album in proximity to the display of his face. This marketing campaign, while it was innovative and took advantage of the then current technology, caused a disturbance by violating local noise ordinances. Many presentations were shut down shortly after starting. Moreover, these presentations did not capitalize on the vast data capture potential related to a content presentation. Some embodiments may overcome one or more of these drawbacks of this Kanye West marketing campaign.

For example, in some embodiments, smartphones may be used as audio devices to present the audio portion of this presentation. Normal ear audio and/or speaker audio may be used depending on user and presentation preference. For example, to comply with a noise ordinance, to reduce interference issues and/or syncing demands, and/or to maintain privacy, ear audio element may be used. As another example, to maximize dispersion, to attract others, and/or to create a louder experience, a speaker element may be used.

A mobile device may cause an audio presentation that accompanies the Kanye presentation to be played through such a desired audio element. A variety of systems and/or methods that may be used to perform such a presentation are described herein.

As one example, a website may be established. A source of audio may be established (e.g., a data source on a server). Users may access the website from mobile devices. To make access to the website seamless and easy, a user may use near field communication to pull the website up on a device. For example, one or more NFC emitters may be placed near a Kanye presentation. When NFC enabled devices are put near such an emitter, the devices may be caused to visit the website. The website may include an element (e.g., a Java element or other media enabled element) that causes the mobile device to play a make a desired audio presentation in connection with the visual Kanye presentation. For example, an audio player may stream content from the audio data source through the website (e.g., in response to accessing the website, in response to a user actuating a play control through a web interface) to make the device present an audio presentation. The content may be streamed from a source so that presentations are made at the same time or nearly the same time as one another (e.g., to cause a coordinated launch event to occur with the release of a single from the album).

An NFC emitter device may also cause data about devices that communicate therewith to be recorded. The website may also record information about devices that access the website. A website may query a user for information in order to enable an audio presentation and/or after the audio presentation is made. By collecting such information a user's preferences may be tracked and used for advertising and/or other purposes.

As another example, an application may run on one or more smartphones (e.g., a native app). The application may control the phone to make an audio presentation in response to one or more inputs. For example, in response to a location and/or time, in response to a NFC input, in response to a QR code read, and so on a device may be caused to make an audio presentation to enhance the Kanye visual display. Rather than relying upon a user to access a website, an application may cause and/or allow a smartphone to access such an enhanced presentation without need to access the World Wide Web and/or obtain a universal resource locator. For example, a user may be presented with an interface of an application through which the user may select available enhancements at a given time and/or location (e.g., near a Kanye display at a time of a Kanye release, the user may be presented with the Kanye audio track to play). As another example, a user may access an NFC signal or QR code and the application may in response cause the audio presentation to be presented.

Such an application may report access by a user to an enhanced presentation. Such an application may report when a user had access but did not choose to access an enhanced presentation. Such reports may be used to track a user for advertising and/or other purposes.

It should be recognized that while some examples of improving the Kanye West marketing campaign are given, that such examples are non-limiting examples only. Such examples illustrate some example functionality that may be present in some embodiments, and functionality of one example may be used in others. For example, a website may be location locked similar to a native application. Examples of methods and/or systems that may be used in some embodiments (e.g., to facilitate described functionality) are described herein.

The Harmon Corner

An intersection in Las Vegas known as Harmon corner where Las Vegas Boulevard interests with Harmon Boulevard is home to a digital billboard. In some embodiments, this display device at Harmon Corner may act as a primary display for video output in a presentation. In some embodiments, audio or any other enhancement may be added to the presentation through the use of, for example, a smartphone.

Figure 1B:
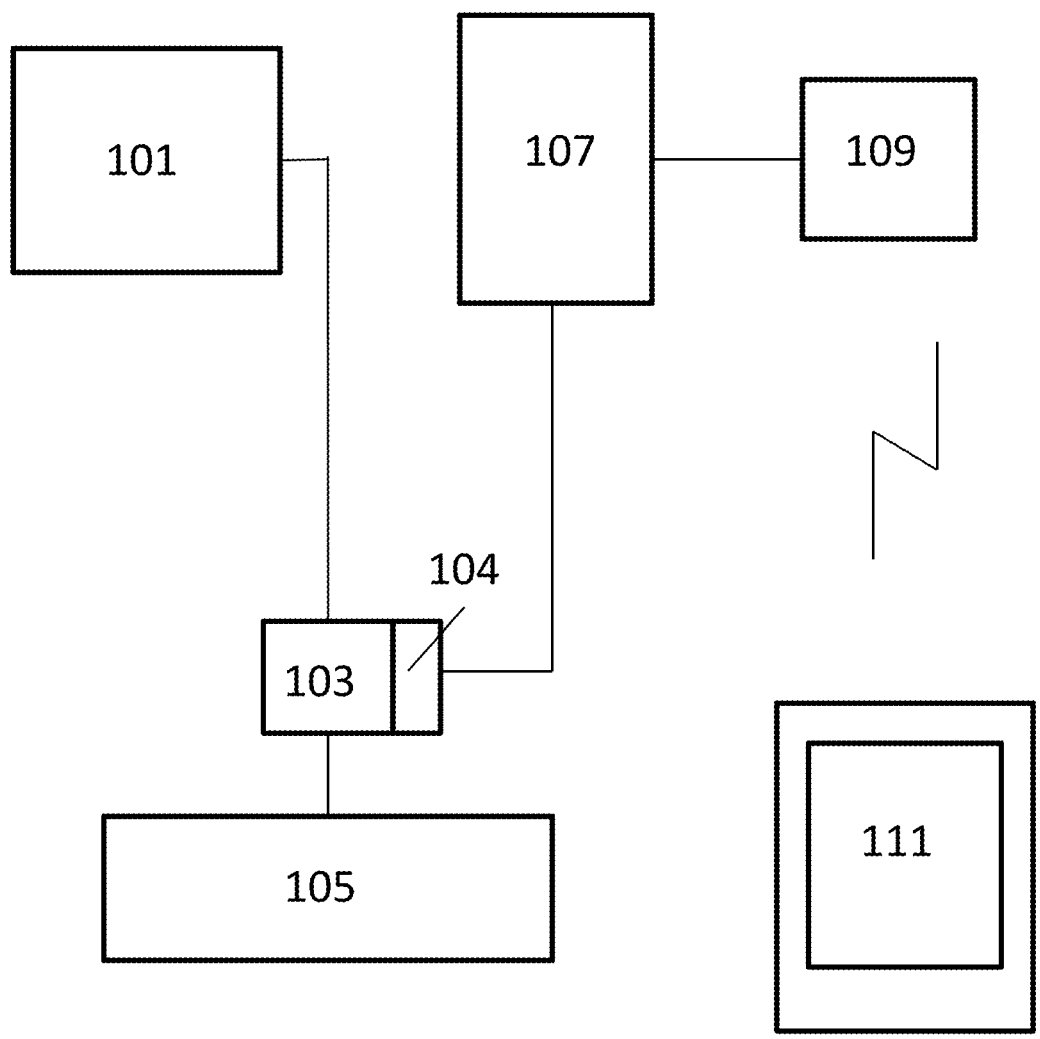

FIGS. 1a and 1b illustrate example systems that may be used in some embodiments to enable the Harmon Corner enhanced experience or a similar experience in any of a variety of context (e.g., the Kanye West Paradigm and/or other examples described herein). As illustrated, such a system may include a data source 101, a content player 103, a display device 105, a server 107, an access point 109, an enhancement device 111, and/or an enhancement player 104.

Various components may communicate with one another in any manner. For examples, some components may use a public network such as the Internet and/or a cellular network to communicate, some components may use a dedicated networks such as a Local Area Network to communicate. Any combination or arrangement of communication connections may be used in various embodiments. For example, as illustrated in FIG. 1a, the data source 101, content player 103, server 107, and access point 109 may communicate using the Internet; content player 103 and display device 105 may communicate using a LAN and/or data bus, and access point 109 and enhancement device 111 may communicate using a 4G cellular network.

It should be recognized that the examples of FIGS. 1a and 1b are given as non-limiting examples only. Other embodiments may include any arrangement and/or combination of devices. For example, as described elsewhere other embodiments may include other types of primary devices other than display devices, may include multiple primary devices such as multiple displays, may include other types of enhancement devices with a variety of output types, may include multiple enhancement devices, may include multiple data sources or other components, may include different types of access points for different data, and so on.

Data source 101 may include a computing device. Such a device enable an operator of a presentation system to control the operation of the system. For example, such a device may enable an operator to schedule when presentations are to be made, select presentations, control the output of presentations, adjust the relative timing of presentations or presentation parts (e.g., audio vs. visual), and so on. Such a computing device may receive input from an operator and/or control device directing the scheduling and/or play of one or more presentations. Such a computing device may receive content for the presentations (e.g., video data, audio data, haptic output data, etc.). The data may be recorded data such as video files in digital form and/or live data, such as a stream of data from an outside source such as a television feed. Such a computing device may receive input directing how such content is to be presented (e.g., input identifying that video data is to be presented through display device 105 and that audio data is to be presented with a 1ms delay through one or more enhancement devices 111). Such a computing device may provide an interface through which an operator may include commands and data to make a presentation.

Data source 101 may transmit data to content player 103 and server 107 (and in some embodiments, enhancement player 104). For example, video data may be transmitted to content player 103 and audio data may be transmitted to server 107. The data may be transmitted in response to being received such as a live television stream comes in. The data may be transmitted in advance of being played such as if an entire file is transmitted prior to being played. The transmitted data may indicate how and/or when to present the data. For example, the video data transmitted to the content player may indicate that the presentation should be started at a certain time. Similarly, audio data transmitted to the server may indicate that the audio presentation should be started at a certain time. The times may be different (e.g., to account for latency and/or because a difference is desired for presentation purposes) and/or the same. For each desired presentation that includes use of the enhancement services and primary display, such a transmission may be made.

Data source 101 may receive data as a single source of data (e.g., a single file or single stream). Data source may process the data to split the audio and video from the data. Data source may process the data to introduce any desired delay or offset. Data source may direct the data to the appropriate destination to make the presentation (e.g., streaming and/or in whole). Data source may direct the destinations on how to present the data (e.g., at what time).

Content player 103 may include a computing device. Such a computing device may be configured to receive media data and control a display device to present the media data. A variety of media players are known in the art. Some example media players may be obtained from YESCO or Panasonic. Content player 103 may receive video data from data source 101. In response to receiving the data, content player may control display device 105 to display the data (e.g., by transmitting electronic control signals to the display device). In some embodiments, the data received from the data source may identify a time for presentation and/or any other characteristics for presentation. The content player may play the content in accordance with such instructions (e.g., by playing the content at a specified time).

Display device 105 may include a digital billboard and/or any other display device and/or primary output device. In some embodiments, such a digital billboard may include the Harmon Corner billboard. Such a billboard may be designed by YESCO or Panasonic. Such a display device may be configured to receive control signals from content player 103 and display a presentation in response. For example, such data may be received through a data bus or LAN connecting the display device to the content player. Such signals may identify what to output at each of a plurality of pixel locations on the display device to make up a presentation. The signals may change over time to cause a display to change (e.g., to make a moving display such as a video presentation).

Server 107 may include a computing device with a data storage component. For example, such a device may include a streaming content server, webserver, and/or cloud storage device. Some examples devices that may be used, may be available through Rack Space of San Antonio, Tex., and/or Go Daddy of Scottsdale, Ariz. Such a device may be configured to receive data from the data source (or in other embodiments the enhancement player 104). In response to receiving such data, the server may present the data through one or more enhancement devices 111. The server may receive the data in advance of a presentation (e.g., for recorded content) and/or receive a stream of data (e.g., for live content). The server may forward and/or otherwise allow the enhancement devices to obtain access to the data in an appropriate format. The server may reformat the data to a format that is appropriate for an enhancement device attempting to access the data.

In some embodiments, the server may act as a webserver that responds to http requests for access to data (e.g., streaming data, a website, etc.). In response to a web browser or web app accessing the server (e.g., using a URL), the server may provide the data in accordance with instructions received form the data source (e.g., to present what part of the data at what time). For example, the server may present a designated portion of the data through web browsers on a plurality of enhancement devices at a designated time. The server may stream the data to the devices in accordance with a presentation plan so that the audio output and video output act together.

In some embodiments, the server may act as a source of data for an enhancement device running an application. The application and server may act in a client/server relationship to stream or otherwise provide data from the server to the client enhancement device. In some embodiments, the client enhancement device may have control over the presentation (e.g., the client may receive the data and decide when to present it) and the server may identify to the client how (e.g., when) to make the presentation. In some embodiments, the server may control the client enhancement device to make the presentation without control by the client (e.g., a direct streaming of data). In some embodiments, the client and server may act together to determine how to present the presentation. For example, the client may report latency and/or location information and the server may use that to adjust how the presentation is streamed for the specific client enhancement device (or whether it is even available for location locked presentations).

It should be recognized that the examples of a server and its relationship with a client are given as non-limiting examples only. Any arrangement and combination of responsibilities and/or interactions between a client and a server whether a webserver or otherwise and/or whether a web browser client or otherwise may be used in various embodiments.

Access point 109 may include a wired and/or wireless access point for communication. For example, in the illustration of FIG. 1a, the access point may be a cell tower. However, the access point may include any device that allows an enhancement device to communicate to receive presentation data (e.g., to communicate with server 107). For example, such a device may include a wireless router, a Bluetooth transmitter, a wired router, and/or any communication network access point through which data may be communicated to one or more enhancement devices. Multiple access points may be used in some embodiments (e.g., multiple cell towers, a cell tower and a Wi-Fi router, and so on in any combination for one or more enhancement devices attached in any arrangement to such access points).

Enhancement device 111 may include a device capable of providing the desired enhancement to a primary device. For example, in the illustrated example of FIG. 1a such a device may include a smartphone that provides audio enhancement to display device 105. The enhancement device may receive audio (or other enhancement) data from server 107 and in response present that data to a user to make a enhance presentation with display device 105.

In some embodiments, device 111 may operate a web browser. The web browser may be directed at a URL of the server 107 and may request access to a stream of the data. The browser may receive that stream and present the audio in that stream to the user. The user may access the web browser and information on the website through an interface of the enhancement device.

In some embodiments, device 111 may operate an application (e.g., a native app). The application may communicate with the server and control the device to enable proper presentation of data. For example, the application may request data from the server, receive the data, and present the data to the user to enhance the display device. Data received may identify information about how to present the data (e.g., when, through which output, etc.) and the application may control the device to present the data accordingly. The application may provide data to the server such as location, time, latency, and so on that may be used to enable and/or adjust the presentation.

In some embodiments, device 111 may include an NFC component that may allow input form an outside NFC device (e.g., a card with an NFC chip). Interaction with the NFC component may enable access to the server and/or access to the data through the server. For example, an NFC input may control the web browser to direct to the URL of the server. As another example, the NFC may communicate a key code/password to an application that unlocks the data when presented form the application to the server. In some embodiments, only devices that have the URL and/or the key may be allowed to access the data. Other types of input may also be included, such as Wi-Fi, Bluetooth, camera, etc. and may be similarly used to enable a connection to the server.

It should be recognized that the examples of enhancement devices and interactions with the server are given as non-limiting examples only. Other devices may take any form and include any desired functionality that may enable an enhancement to a primary device. Moreover, it should be recognized that while a single enhancement device is shown, that any number of enhancement devices may output enhancements for a display device. For example, any viewers of a Harmon Corner display may access the enhancement for that display through their smartphones. The enhancement outputs may be the same or different (e.g., differently timed, different content) through different devices. The devices may be different or same types of devices (e.g., android phones and iPhones or only iPhones).

In the alternative embodiment of FIG. 1b, enhancement player 104 is shown as a component of and/or proximate to the content player 103. The content player and/or enhancement player may receive both primary and enhancement data form a data source in such an arrangement. The content player and/or enhancement player may separate enhancement content form primary content and may push the enhancement content to the server. In such an arrangement, the data source may not be responsible for separating and/or redirecting the enhancement content, but rather the content player and/or enhancement player may have such responsibility. The server may receive enhancement content from the enhancement player rather than the data source in such an arrangement.

Keeping such content decisions close to the content player and/or display device may work best if the player is more than a dumb terminal and has scheduling responsibilities and/or input from multiple data sources. In such arrangements, keeping the content splitting functions local may enable a verification that the contents do not become disjointed. On the other hand, the arrangement of FIG. 1a may have advantages as well in that it may allow a dumb terminal control of the display device and/or more centralized control of the enhancement services that may provide lower latency.

The descriptions of the example components and the entirety of the figures are given as non-limiting examples. Other components and arrangements with other functionality may be used in various embodiments as desired. For example, in some embodiments, a sever and data source may be a same component, a server and content player may be a same component, a data source and content player may be a same component, and so on. As another example, in some embodiments, a location service may be included that reports enhancement device location to a server so that the server may lock, unlock and/or adjust a presentation based on the location. Such allocation serve may include a GPS service (e.g., of a phone reporting to the server), a triangulation service, a geofencing service, and so on. As yet another example, some embodiments may include an access point restricting element that unlocks content in response to the content being requested through a particular one or more access points. In such an embodiment, a local Wi-Fi network may be established near a display device and based on access through that Wi-Fi network, one or more enhancement devices may be given access to an enhancement output. In some embodiments, only those devices may be given access. An application running on an enhancement device may cause the device to automatically connect to such a network if it is available.

Moreover, even though some embodiments are described as including a single presentation, other embodiments may include making any number of presentations through any number of devices. For example, multiple similar presentations may be made at a variety of locations using primary and enhancement devices proximate to those locations (e.g., simultaneously, at different times). In some embodiment, different presentations may be made at different locations. In some embodiments a plurality of presentations may be made in a single location (e.g., according to a schedule, sequentially, simultaneously). A single or multiple data sources may drive such plurality of presentations as desired.

Figure 2:
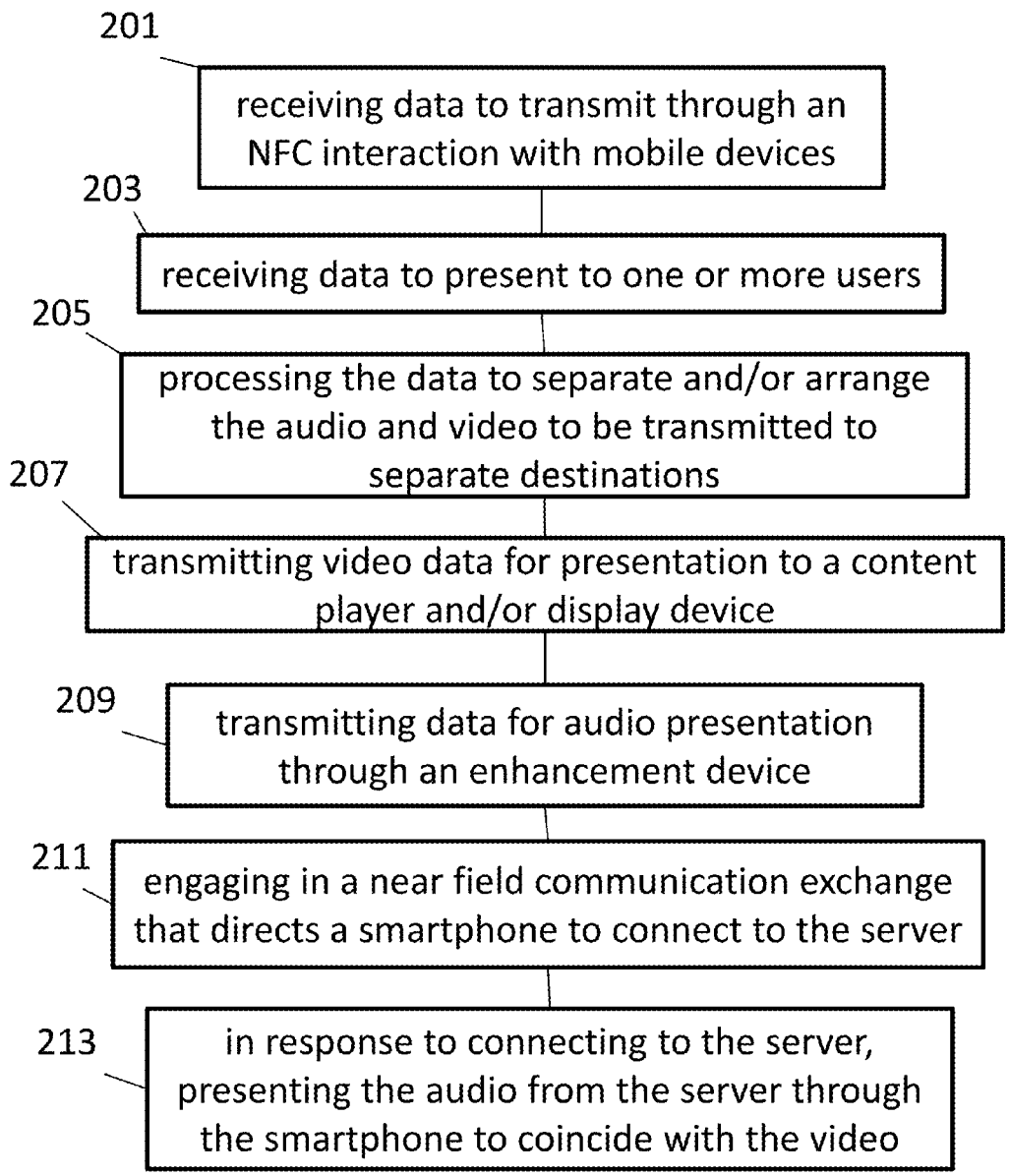
FIG. 2 illustrates an example method that may be performed in some embodiments.

FIG. 2 illustrates an example method that may be performed in some embodiments. The method of FIG. 2 may be used, for example, to facilitate a user at the Harmon Corner to enhance a video playing on the Harmon Corner billboard with an audio stream through a smartphone. The method may include use of an NFC device to instruct the smartphone to access a data stream for the audio. The method may include a coordinated audio and video control from a source of presentation data.

As indicated at 201, some embodiments may include receiving data to transmit through an NFC interaction with mobile devices. For example, an NFC transmitter may be programmed to transmit data indicating a source of audio data (e.g., a URL of a server), and/or some information that may enable the playing of audio data (e.g., a key to access the data, a link to an application to install to access the data, etc.). Such information may be stored so that it may be transmitted to one or more NFC enabled devices that enter an NFC field. This access data may define an access parameter for one more user to gain access to a portion of a presentation (e.g., by accessing an identified server, by logging in with an access code to a resource, by unencrypting a file with an encryption key, etc.).

As indicated at 203, some embodiments may include receiving data to present to one or more users. The data may include video data to present through a display device and audio data to present through a smart phone. The data may include a data stream such as of a live event and/or a data file such as of a recorded event. Such data may be received from a controller (e.g., a person and/or device controlling a data source). This received presentation data may be defined by audio data, video data, haptic data, and/or any other type of presentation data. Such presentation data may match a location with an output desired (e.g., a different audio presentation based on a location of a device making the presentation).

As indicated at 205, some embodiments may include processing the data to separate and/or arrange the audio and video to be transmitted to separate destinations. For example, a computer algorithm may process the data to remove audio data from a data stream and direct that audio data to a server. The computer algorithm may direct the remaining video data from the data stream to the content player. In some embodiments, data audio and video data my come to a data source separated so that such data may not apply such separating processing. In some embodiments, a server and/or content player may accept unseparated data so a data source may not perform such separating processing. Processing presentation data may include separating audio and video data. Processing presentation data may include preparing (e.g., formatting, addressing, etc.) audio and video data for presentation through separate destinations. Processing presentation data may include inputting timing data to audio data so that audio and video data may be synchronized in a presentation. Processing presentation data may include inputting scheduling information so that a presentation e.g., of a video data) may be made at a desired time.

In some embodiments, an indication regarding a matching between an audio and video data may be received. Such an indication may identify a matchup between an audio stream and a video stream that are received by the data source. Such an indication may identify an adjustment to an audio stream relative to a video stream that are received together. A data source may adjust an audio and/or video stream in accordance with such information (e.g., delay an audio stream, delay a video stream in accordance with such an indication). In other embodiments, a data source may indicate to a destination that the adjustment should be made there.

As indicated at 207, some embodiments may include transmitting video data for presentation to a content player and/or display device. For example, the data source may transmit a video stream to the content player that may drive the display to present the video data on the Harmon Corner billboard. The data transmitted may indicate a time to start a presentation. The data may be streamed for immediate presentation and/or data that is recorded for later presentation at an indicated time. Video data may be transmitted to a publically viewable display device such as a billboard. Such transmission may be made to a content controller that controls the content displayed on the device.

In some embodiments, a content player may receive video data for presentation and in response may drive a display device to present a video presentation embodied in the data. For example, the content player may receive a video stream from the data source and cause the video to be presented on the Harmon corner billboard. In some embodiments, an indication of when to begin a presentation may be received and the video data may be presented at an indicated time. In some embodiments, the video may be streamed from a data source. A content player may introduce some latency into a stream of video that may be accounted for, for example by adjusting a streaming rate or start time between the audio and video streams such as by introducing an offset like the one discussed with respect to 205 and/or in a manner as described herein or otherwise.

As indicated at 209, some embodiments may include transmitting data for audio presentation through an enhancement device. For example, the data source may transmit an audio stream to the server that may enable presentation of the audio through smartphones that access the server. The data may indicate the time to start a presentation and/or any other characteristics of the presentation (e.g., length, speed, location limitation, etc.). The data may be streamed for immediate presentation and/or data that is recorded for later presentation at an indicated time.

In some embodiments, a server may receive audio data for presentation and in response may enable a smartphone to present the audio presentation embodied in the data to coincide with the video presentation. For example, the server may receive an audio stream from the data source and cause the audio to be transmitted to one or more smartphones that communicate with the server. In some embodiments, an indication of when to begin a presentation may be received and the audio data may be presented at an indicated time. If a user access the server at a later time, the user may be presented with data that is offset from the start time based on the access time (e.g., if the user access the server 1 minute after the audio was to be started, the user may be presented with audio from 1 minute later than the start). In some embodiment an audio may be stream from a data source. A server may introduce some latency into a stream of audio that may be accounted for, for example by adjusting a streaming rate or start time between the audio and video streams such as by introducing an offset like the one discussed with respect to 205 and/or in a manner as described herein or otherwise. In some embodiments, a data source may determine respective latencies between audio and video outputs and adjust streaming accordingly.

Elements 203 to 209 may have been described with respect to the example FIG. 1a. However, similar elements may occur in an embodiment of FIG. 1b and/or other embodiments. For example, a content player and/or enhancement player may receive data from a data source and process it to introduce any needed delay. The enhancement player may transmit audio data extracted from data received from the data source to the server.

As indicated at 211, some embodiments may include engaging in a near field communication exchange or other communication exchange that provides access information to a mobile device (e.g., directs a smartphone to connect to the server). In some embodiments, an NFC transmitter and a NFC enabled smartphone may come into proximity and engage in an NFC session. The transmitter may transmit an indication of information that may enable the playing of audio data to the smartphone. The smart phone may receive that information and in response communicate with the server to enable playing of the audio. For example, in some embodiments, the smartphone may receive a URL of the server that the NFC transmitter transmitted through the NFC session, and in response to receiving the URL the smartphone may direct a web browser to access the server (e.g., a webpage hosted at the server, a webpage that has content hosted at the server). In another example embodiment, the information may include a key that an application may use to unlock the ability to play the audio.

As indicated at 213, some embodiments may include, in response to connecting to the server, presenting the audio from the server through the smartphone to coincide with the video. For example, the smartphone may stream the audio from the server and play it through a speaker so that the audio coincides with a video presentation made at the display device (e.g., the Harmon Corner billboard). In some embodiments, a user of the smartphone may be asked to take one or more actions prior to such a presentation. For example, a user may be asked to actuate a control (e.g., press a play button in an interface), install an application, accept an agreement, enter information (e.g., identifying information that may be used for marketing or other purposes), and so on. In response to performing such action and connecting to the server, the audio presentation may be made. Some embodiments may use a Real Time Streaming Protocol and/or a Real Time Transport Control Protocol to stream content. It should be recognized that this is a non-limiting example of a manner of facilitating output of a presentation through a displaying of the video data by the publically viewable display device and a playing of the audio data by the mobile devices. A variety of examples of such facilitating of a presentation are given herein.

By performing such an example method of FIG. 2, a video presentation through a display device may be enhanced with audio presented through a smartphone. It should be recognized that this method is given as an example only and that other embodiment may include different, fewer, more, defiantly ordered, similar, and/or no elements similar to those described. Some embodiments, for example may only include actions taken by a data source. As another example, some embodiments may include a location and/or Wi-Fi locking functionality. As yet another example, some embodiments may include a QR code or URL that may indicate information enabling access to the server instead of a NFC device. As still a further example, so embodiments may include one or more syncing functionalities.

Figure 3:
FIG. 3 illustrates an example of an interaction that may be enabled in some embodiments.

FIG. 3 illustrates an example of this method as it might appear in action at the Harmon Corner.

Syncing

Latency and/or other issues may affect how unified a presentation of video and audio from different sources appears. There may be at least two types of syncing that could be a concern in some embodiments. First, a video presentation and an audio presentation may come out of sync with one another so that the audio is not presented at an appropriate time to match the video (e.g., a voice is presented before or after a speaker is shown to talk). Viewers of such a presentation may be annoyed by this disjointed audio and video and content providers (e.g., advertisers) may not want to use a technology that annoys their potential customers. Second, audio presentations may come out of sync with one another (e.g., two smartphones may not present a same audio at a same time). This type of syncing issue may turn a set of speaker phones that might together be presenting a coherent presentation into a set of speaker phones that instead appear to be outputting noise that is not comprehensible. This may not make for a good experience for customers either. Some embodiments may include one or more features to overcome a potential syncing issue such as one of these two types of syncing.

The telecommunications industry has spent a significant amount of resources on eliminating what is known as mouth to ear delay in calls. Some embodiments, in order to reduce latency issues may utilize this work. For example, instead of accessing a source of enhancement data through the Internet, a device may access the source through a telephone connection. For example, in response to a NFC interaction, a smartphone may be controlled to call a phone number. The phone number may access the source of audio (e.g., an audio stream may be presented as a normal call audio would be presented through the phone). The source of audio may include an automated call center that connects calls to a recording and/or audio stream. An application on a smartphone may mask the outgoing call by presenting a graphic over a typical call screen. This call based solution to latency may not solve all latency issues and may introduce some user concerns (e.g., using minutes, making it more difficult to access incoming calls).

As another example solution that may be combined with any other solution described herein, some embodiments may include offsetting portions of a presentation. For example, a video portion may be transmitted for presentation after a corresponding audio portion. A server may determine a latency level between a smartphone and the server and cause the audio to be presented to account for that latency. For example, if a phone and server have a 20 ms delay compared to a display device, then the server may present audio to the phone 20 ms in advance of the video presentation. A server may determine that latency by, for example pinging a phone, inspecting packets from the phone, and/or any method of latency determination.

In some embodiments, an average latency over some period of time may be used. In some embodiments, a latency may change and a presentation may change accordingly. For example, latency may increase and an audio portion may be advanced accordingly (e.g., a portion may be sped up so that the audio is presented further in advance of the video, a portion may be skipped so that the audio is presented further in advance of the video). An ongoing monitoring of latency may be used so that as latency changes, the audio presentation may be adjusted. This type of offsetting may be combined with a calling embodiment. In a call, latency typically is more stable and so a single offsetting may be used more reliably.

In some embodiments, a portion of an enhancement presentation and/or primary presentation may be preloaded to a device in advance of the presentation. For example, audio data may be cached to a smartphone in advance of a time when the audio is to be presented. By preloading that audio data, latency issues with respect to data transmission may be eliminated as an issue that may affect syncing. A smartphone may play the content at an identified time and/or starting at an identified point (e.g., identified by the server). Such caching may be an effective method of eliminating network latency issues for recorded events.

A caching solution may have limitations when live events are presented (e.g., because there may not be cacheable data to transmit as the event has not yet occurred) and/or when the enhancement device itself introduces latency (e.g., in processing the data for presentation).

In some embodiments to overcome the lack of cacheability, an entire presentation may be delayed to allow caching to occur. For example, transmission of video and/or audio data that for a live presentation may be delayed (e.g., by a data source) so that the presentation is actually not live. A delay may be sufficient to provide a reliable amount of caching to remote devices. Such a delay, for example may include 200 ms, 10 ms, 1 second, 10 seconds, 1 minute, 10 minutes, 1 hour, and/or any other desired time to allow sufficient caching to reduce latency issues. In response to delaying the sufficient amount time, transmission of the data form the data source to the appropriate destination may be made (e.g., with/without an offset).

In some embodiments an input element of an enhancement device may measure output of the device to determine output latency. While some examples may have addressed transmission latency, a device itself may introduce latency in the presentation of data. As an example, a microphone of a smartphone may record audio presented by the smartphone. That audio may be time stamped and transmitted to a server. The timestamp and audio output may be compared to a desired output at that time to determine a latency of a presentation. Transmission of data may be offset to account for that measured latency. Such a measuring of latency may take place one an ongoing basis, as a calibration step before a presentation, and/or in any other manner.

As another example of a syncing technique that may be used in some embodiments, a Bluetooth and/or other local network technology may be used to coordinate presentations with nearby devices. For example, one smartphone may detect smartphones that are within Bluetooth range. That range may be used as a proxy for audible range. The device may coordinate presentation with those nearby devices. An application that presents the audio may be configured to allow such coordination to occur through a Bluetooth connection.

In some embodiments, one phone may act as a master of other phones and direct those phones on how to present data. For example, the master phone may indicate to the other phones that they should start presenting bytes X of the data stream at time Y. The other devices may be responsible for ensuring proper latency is accounted for (e.g., by making a microphone check of latency to audio output). The master device may be chosen in any manner (e.g., randomly, first come first serve). Each device may be part of multiple Bluetooth device swarms that may or may not overlap with one another. Each device may act as master and slave in various contexts. A device acting as master in swarm A and slave in swarm B may pass on its instructions from swarm B to swarm A.

It should be recognized that this example of a swamp of devices acting cooperatively to present a unified audio presentation is given as a non-limiting example only and that any manner of device coordination may be used if desired.

Figure 4:
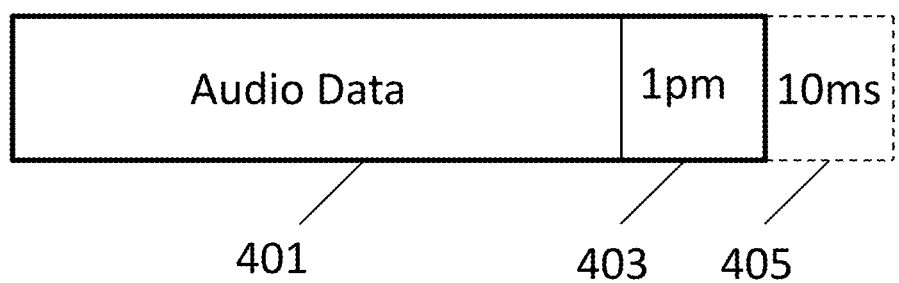
FIG. 4 illustrates an example of a data format that may be used in some embodiments.

In some embodiments, data transmitted to an output device may be formatted in a transmission protocol that includes presentation information. An output device may be configured to interpret the data and presentation information so that a presentation of the data is made in accordance with the presentation information. The presentation information may include, for example, a time at which the data should be presented. By including such information with the transmitted data, a transmission source may control an output device to reduce an issue of latency that may be present in traditional streaming methods. FIG. 4 illustrates an example format of data that may be used to facilitate such an interaction. Such a format may represent a format for an application layer protocol.

The packet may include a payload of audio data indicate at 401. In some embodiments, the payload may be of variable length. In some embodiments, the payload may be of fixed length. The payload may include audio data for a part of the presentation. An entire audio presentation may be broken into sequential chunks and placed into such packets that are transmitted to an output device (e.g., by a server, by a data source, etc.).

The packet may include a start time indicator 403. The start time indicator may identify a time at which an output of the audio data is to begin. The start time indicator may be of fixed and/or variable length. The start time indicator may be as specific as desired (e.g., to the millisecond, to the second, etc.). Each segment of audio data may have an associated start time indicator. A data packet may include both the audio data and its corresponding start time indicator. A source of this packet (e.g., a data source, a server, a content player, etc.) may determine the start time for the audio data and form the packet by combining these elements.

A start time may be determined based on instructions for scheduling a presentation (e.g., from a controller of a presentation). For example, if a data source is instructed to begin a presentation at 1 pm exactly, then a first packet may identify 1 pm exactly. A first packet may contain audio data for 10 milliseconds so a second packet may identify 1 pm and ten milliseconds as a start time indicator. A time may indicate a date and/or may be interpreted to be the current date and/or otherwise may include information so that a date may be inferred. It should be recognized that 10 milliseconds is given as an example only and that a data packet may include any desired amount of data according to the specifics of a protocol. More data may allow for fewer transmissions but make loss more tragic and less data may eliminate fear of loss but may require a larger processing and transmission rates.

Some embodiments may include any number of presentation descriptors. These descriptors may be optional and/or mandatory for a streaming protocol. An example is given in a dashed area indicated by 405 that shows an indicator for a length of time it should take to play the audio portion in the payload. For example, the audio data may be indicated to start at 1 pm and ten milliseconds and last for 10 millisecond of time. A source of such a packet may determine the length of time for each payload of data and include in the packet the length of time information. For example, a data source may determine by processing a source file or stream to match an original length of time in the file or stream.

Some embodiments of such a protocol may not include such a length of play descriptor. In such embodiments, an agreed upon formatting of data and/or length of time per packet may be used. That formatting (e.g., encoding) of data and/or agreed upon length of time may be used by the receiving device to identify how long it should take to play the data in the payload.

A variety of other descriptors may be used in some versions of this protocol. The descriptors may be options and/or mandatory in those versions of the protocol. For example, some embodiments may include a descriptor of a volume level, a descriptor of an output type (e.g., speaker phone vs handset speaker), a descriptor of whether a location check should be made to enable play, and/or any other descriptor that may describe how a presentation should be made. One or more header fields that may be optional and/or mandatory may be included in some embodiments. For example, some embodiments may include a data length indicator, checksum data, a source identifier, a session identifier, a destination identifier, an identifier of a time source, and/or any other header content desired. A source of such a packet may determine the contents of the fields of the packet in accordance with a desired output and desired interaction with an output device.

An output device such as a smartphone may receive the data packet and cause the audio data to be presented in accordance with the presentation descriptors. For example, an application running on the smartphone whether it be a web browser, a plugin for a browser, a native application designed for enhancement output, and/or some other application may be given the data and interpret the data according to the protocol standards. Such an application may extract the payload, receive input of the time and cause the payload to be played when the time equals the indicated time in the packet. The payload may be played at a speed so that it takes an indicated and/or otherwise agreed upon length of time to play the payload. The application may control the phone to play the payload in accordance with any other descriptors (e.g., by adjusting volume, by controlling an indicated speaker, and so on).

In some embodiments, a time used to determine a start time on a phone may be a local time set on the phone. In some embodiments, because times may be off from phone to phone, a time set locally on a phone may not be a trusted source. Some embodiments may sync a time with a trusted time source prior to playing an output (e.g., sync to a GPS time). Some embodiments may determine if a time is synced to a trusted source prior to beginning and may use the local time if it is synced. Some embodiments may use a trusted time source such as a GPS time always or if the local time is not synced with the trusted source.

A plurality of such packets (e.g., one for each portion of a presentation) may be sent from a source (e.g., a server, a data source). All of part of that stream may be received by a output device (e.g., a smartphone). Each received packet may be acted upon to create a unified output in accordance with the descriptors to coincide with another presentation (e.g., a video presentation on a billboard). A missed packet may be ignored leaving a gap in the presentation. An acknowledgement protocol may be used so that missed packets may be resent. In some embodiments, if a packet is received after its stat time it may be ignored. In some embodiments, if a packet is received after its start time and after it should have been finished playing (e.g., a time equal to or later than its start time plus its length of time field) it may be ignored. In some embodiments, if a packet is received after its start time but before it was to have finished playing it may be processed and the portion of the payload that is still to be played may be played. For example, if a packet is received at 1 pm and 5 ms that has a 1 pm start time and a 10 ms length, then it may be processed and a second half of the audio data may be played to fill the time from 1 pm and 5 ms to 1 pm and 10 ms.

It should be recognized that the example protocol and data packet of FIG. 4 and the accompanying discussion presents non-limiting examples only. For example, although the discussion has been given in terms of an audio presentation it should be recognized that the data in the payload may take any form (e.g., video, haptic, scent, taste, etc.). It should also be recognized that header or descriptors may be arranged to match that data type (e.g., brightness for video, intensity for haptic, and so on).

It should also be recognized that while the example is given in terms of one type of data being transmitted to an enhancement device, that such description is also non-limiting. For example, in some embodiment's multiple types of outputs may be desired in an enhancement device (e.g., audio and haptic). Accordingly, multiple types of data either in a single or multiple streams may be transmitted to that device. As another example, different streams of different types of data according to such a protocol may be sent to different enhancement device so that their outputs are coordinated (e.g., audio stream to a smartphone and haptic stream to a smart watch). As yet another example, a stream according to such a protocol may be sent to a primary output device (e.g., a digital billboard, a content player) so that the primary output is controlled similarly to the enhancement device to make a coordinated presentation.

Such data packet use may help reduce latency issues both between enhancement devices and between an enhancement device and a primary output device by coordinating the time of presentations at each device (e.g., to a trusted time source).

It should be recognized that the various examples of syncing techniques are given as non-limiting examples only. Various techniques described herein or elsewhere may be combined and/or used in any manner as desired. For example, in some embodiments, a calibration output sound and/or ongoing calibration may be played and recorded using a microphone to determine a devices self-latency. An output of a data packet stream according to the protocol of FIG. 4 may be adjusted to account for that device latency (e.g., if a 0.01 ms latency is introduced by the device when a test tone that may or may not be human perceptible is played, then start times of received packets may be adjusted by subtracting 0.01 ms from them).

Broadcast Interactions

Some embodiments may include providing an auxiliary output to a remote primary output, to a series of primary outputs, and/or to a primate primary output. For example, a television or other entertainment system may present video to one or more people and an auxiliary device such as a smartphone may be used to present audio to coincide with that video presentation.

Figure 5:
FIG. 5 illustrates an example of an interaction that may be enabled in some embodiments.

FIG. 5 shows an example of this in an airport gate where the television acts as a primary source to provide video and the smartphone acts as an auxiliary device to provide audio. Airport gates may be loud and access to a listening location for a television may be difficult to come by. Extending the audio of the television through a smartphone may allow more individuals to fully enjoy the entertainment presented by the television. Moreover, multiple televisions may be arranged to present different video outputs (e.g., different channels). A smartphone may select one form that set to listen to. Accordingly by extending the audio through a smartphone, a user is given an expanded universe of entertainment options.

Figure 6:
FIG. 6 illustrates an example of an interaction that may be enabled in some embodiments.

FIG. 6 shows an example of this in an airplane where a seat back entertainment system acts as a primary device to present video and a smartphone acts as an auxiliary device to present audio. By extending audio through a smartphone, a provider of entertainment may gather information about the user that might otherwise not be gathered. Moreover, a passenger may be able to continue listening to an entertainment show while not seated (e.g., when moving about the cabin of a plane).

A similar interaction may occur, for example, in a fitness facility (e.g., a user may be presented with multiple televisions and choose one to listen to while working out), in a sports bar (e.g., in a loud environment with multiple sports being shown on multiple televisions, a user may select one television to listen to and for example may place a smart phone on speaker so that a table of people may listen to that television), in a sports venue such as a racetrack, stadium or arena (e.g., where audio from a video display such as one that provides pregame entertainment may be streamed to a smartphone), in any transit stop (e.g., similar to the airport example), on college campuses, in resorts, in any public space, and/or in any other desired context.

In some embodiments, interaction with a primary display and an augmenting audio source in such an environment may be similar to the examples described elsewhere herein. A system may control and direct audio and/or video data locally and/or remotely. In some embodiments, a delay may be added to synchronize the audio and video. For example, if a live television broadcast is incoming to a gym or other environment, the television broadcast may be processed to obtain the audio from the transmission. The video may be routed to the television (audio as well in some embodiments). The audio may be processed and rerouted to listening smartphones. Processing of the audio may introduce latency differently than the video so that the audio and video may be out of sync. To account for that latency, a delay of the video may be intentionally introduced.

Some embodiments may include a computing device (e.g., a general purpose device programmed to do a specific purpose, a standalone device configured to perform a specific purpose) that may receive input (e.g., from a cable or satellite or antenna input) of a broadcast or other entertainment source (e.g., dvd, etc.). The device may process the input and output it to one or more display and augmenting devices.

Figure 7:
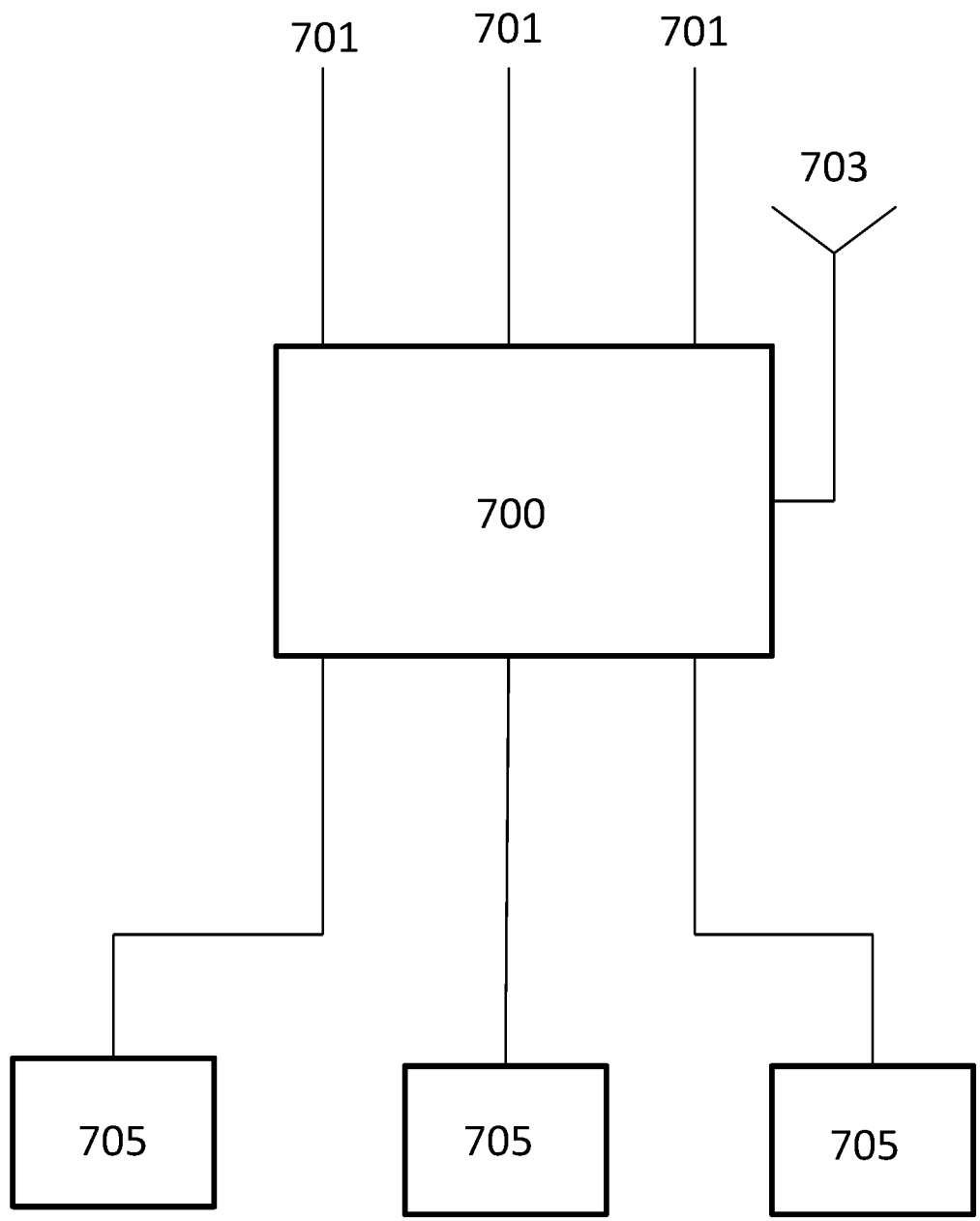
FIG. 7 illustrates and example device that may be used in some embodiments.

FIG. 7 illustrates one example of such a device that may be included in some embodiments. The device 700 may accept a set of inputs (each identified as 701) (1 to any number) of video and audio. The device may stream the audio through a wireless network though antenna 703. In some embodiments, the device may connect in a wired or wireless fashion to a router of a network and act as a network resource to stream to device connected to the network through the router. The device may process the input and direct the video data to televisions (each identified as 705). The device may direct the audio to listening smartphones on the network. If desired, the device may introduce a delay into the video and/or audio stream so that the streams remain in sync. Such a device may be purchased by a gym or other venue and plugged in to provide augmentation serves through smartphones to customers.

A user may access a website hosted by such a device and accessible to local smartphones. The website may present a selection of audio streams that are available for streaming to the smartphones. Streams may be labeled to match labels on televisions. A user may access the website to enable streaming of a desired channel.

In some embodiments, a QR code and/or NFC transmitter may be placed in an environment to provide information that may enable a smartphone to access the website and/or a specific audio stream. For example, a person at a sports bar may scan a QR code on a menu to choose which of ten televisions to listen to. The smartphone may be directed to access a network resource to play the selected audio stream.

In some embodiments, a smartphone may execute an application that enables audio streaming to match video sources in this context. An application may scan a local network for audio stream resources. A list of available resources may be presented through an interface of the application so that a user may select which resource to listen to. The application may connect to the selected resource and stream that audio. Resources may be labeled to coincide with television labels.

It should be recognized that the examples of broadcast interactions are and that of FIG. 7 are given as non-limiting examples only. In some embodiments, for example, the audio data may not be local to a network, but rather may be accessed through a remote internet source. A data source on the internet may provide streams of various channels' audio and the user may access an appropriate stream through the internet rather than through a local network.

Moreover, while examples are given in terms of audio and video with audio being streamed to a smartphone and video being presented through a television, that such examples are non-limiting. Any set of device using any type of input and output may be used. For example, in some embodiments, an audio presenting may be made in a nightclub and a user may select which of a plurality of available video streams that coincide to the audio presentation to view. The video streams, for example, may show different music video versions that accompany a song being played.

Location Affinity

In some embodiments, a location of an enhancement device may influence a presentation of output through the device. For example, in some embodiments, a device may be prohibited and/or enable to make an output based on its location. As another example, an output may be adjusted based on a location of a device.

A server, for example, may determine a location of a device. For example, a server may receive a self-reported location from the device. A smartphone for example may have access to GPS coordinates and report those coordinates to the server. As another example, a server may apply an IP location technique to determine a location of a device based on the IP address of the device. Such a service may be provided through LocAid, for example. Various other location determination techniques may be used such as geofencing, triangulation, and so on. Any information about a phone, other device and/or user may be used to generate a location query that could determine the location of the phone. In some embodiments, the server may determine the location in response to a request to access an audio stream. Location information may be determined to any level of desired specificity.

In some embodiments, if a location is in an approved area, audio data may be sent to the device. In some embodiments, if a location is not in an approved area, audio data may be prevent from being sent to the device. For example, in some embodiments, users may be required to be at Harmon Corner in order to receive audio data coinciding with a video presentation on the Harmon Corner billboard. A GPS coordinate of a smartphone reported by the phone to the server through an application running on the phone may be compared to a location of the Harmon Corner. If the GPS location is within a defined distance (e.g., 100 yards, 10 feet, 100 feet, 1 mile, 10 miles, etc.), a user may be permitted to receive audio data. By limiting presentation in such a manner, a presentation may become an event that draws a crowd to a particular location.

As another example, access to audio may be limited to particular networks. A network may act as a proxy for location For example, in the Kanye West paradigm, a Wi-Fi network may be established near each of the areas where a presentation is being made. People that connect to that any of those networks may be allowed to stream audio that corresponds to the presentation. Those devices that attempt to stream the audio from other networks may be prevented from doing so.

In some embodiments, a location may influence how a presentation is made. For example, users on one side of Harmon Corner may be presented with different audio than users on another side of Harmon Corner. A server may determine a location of a user/device in any manner, and based on that location determine what audio to present to the user in accordance with a plan for a presentation. A controller, for example, may identify that a left channel of audio should be sent to users on one side of a street and a right channel of audio should be sent to users on another side of the street. In response to determining the location of a device a server may transmit an appropriate piece of audio data in accordance with such a plan. In this example, a stereophonic effect may be generated for listeners in a middle of a street (e.g., if users on each side enable a speaker phone with sufficient volume).

In some embodiments, a server may monitor location changes and adjust a presentation accordingly For example, if a user moves from one side of the road to another side of the road during a presentation, the audio being transmitted to the user's device may change accordingly. In some embodiments, a location may be set at a start of a presentation and not updated later.

Examples of stereophonic sound effects are given as a non-limiting example only. In some embodiments any number of different audio presentations may be made in any manner. For example, a differently timed presentation may be given at a plurality of different locations, a completely different presentation may be given in response to determining different locations, and so on.

Although examples in this section discussing different audio presentations being given based on location, it should be recognized that basing such differences on location is a non-limiting example. Some embodiments may use any desired characteristic to determine an audio presentation to be made instead of and/or in addition to location. For example, model of phone, features of a phone, demographic of a user, area code of a phone number, direction of movement of device, direction a device is facing, and so on may be used to determine which of a plurality of audio data to present to a user and/or characteristics of that audio data. Still other embodiments may make a random decision regarding which of a plurality of audio data to present to a user and/or characteristics of that audio data. It should be recognized that examples given herein regarding use of locations and so on are given as non-limiting examples only and that such example may be combined in any way with any other embodiments.

Other Device Examples

Various examples have been given in terms of a smartphone proving an enhancement to display device. Those examples are given as non-limiting examples only. Any combination of devices may be used together to create a unified presentation as desired.

For example, in some embodiments, a smartcar (e.g., a car with a large amount of computer technology, a phone is to smart phone as a car is to a smartcar, a car with internet access, a car that can run applications on an onboard computer, a car such as the Tesla Model S that has an onboard computer that is scheduled to begin receiving apps in mid-2014) may be used to present audio to a user (e.g., a passenger in the car). An augmented reality glasses device (e.g., a device such as the Google Glass device) may be used to present visual information that coincides with the audio presentation. A device such as that of FIG. 7 may be part of the smartcar and allow for the streaming and processing of input to enable the presentation of such coordinated outputs across multiple devices in and/or proximate to the smartcar.

In another embodiment, a smartcar driving down a road may present audio to a user that coincides with a billboard display along the road. For example, based on a location, direction of travel, and/or speed of a smartcar determined by a server that the smartcar communicates with, the smartcar may be configured to make an audio presentation that corresponds to billboard content that is being passed by the smartcar.

In still another example, a smartphone may make an audio presentation to a user. A smartwatch (e.g., a watch that may run applications, a watch such as the Sony Smartwatch or the rumored Apple smartwatch) may make a coordinated haptic output to a user. And, a plurality of display devices that a user passes may make a coordinated visual presentation to the user. A server may control the smartwatch to make the haptic output in concert with the audio output. The server may determine the user's location and control nearby display devices to make a coordinated output to match the audio presentation as well. For example, the server may have access to a mapping of display devices near the user may choose to cause displays that are within a particular distance of the user to make a coordinated output. As the user moves, those displays may change to match the user's location.

Once again it should be recognized that these example are given as non-limiting examples only that illustrate the vast diversity and potential in the various embodiments.

Data and Interactions

Some embodiments may include providing services through an enhancement device and/or collecting information about a user. For example, information about a user may be tracked, stored, collected, etc. for example, for marketing purposes. As another example, a device may be used to obtain information, engage in transactions, and so on that may relate to a presentation.

For example, in some embodiments, information may be requested from a user and/or a device to enable an enhancement of a presentation. Such information may include a name, an address, a phone number, an email address, demographic information, interest, and so on. A user may voluntarily enter that information through an interface (e.g., a webpage, an application interface) and/or such information may be queried from a smartphone by a server.

A user may be tracked based on that information. For example, a user's phone number (or other phone ID such as a MAC address, UUID, etc.) may be recorded in a database for each time the user accesses an enhancement. The user's preferences may be determined based on that tracking. For example, a user may be determined to be a Kanye West fan in response to a user participating in a Kanye West promotion through a smartphone and determined to be a Chicago Bears fan based on the user selecting to listen to one or more Chicago Bears games in a sports bar setting. Tracked information may be sold and/or licensed to advertisers allowing more directed advertising and/or used to determine user interest in future presentations.

In some embodiments, an interface provided to a user may allow the user to access additional features. For example, a user listening to an audio stream for a presentation through a smartphone may be enabled to take additional actions through the smartphone (e.g., actions that may only be available to users that are listening to the audio presentation and/or accessing an application or webpage for accessing the audio presentation). Such actions may include, for example, purchasing of items (e.g., tickets to a show, music, food, VIP access, etc.), download items (e.g., music tracks, ringtone, background images, etc.), viewing videos (e.g., replays of events, different perspectives of an event from that being shown on a display device, etc.), viewing information (e.g., statistics of a sports event, biography information, etc.), playing games (e.g., trivia games with other players, enter into contests, play a demo of a game being launched, etc.), engaging in social media interactions (e.g., make posts to Facebook and/or Twitter, etc.), and/or performing any other desired actions. In some embodiments, advertising and/or branding information may be displayed through a smartphone while a user is listening to an audio output. In some embodiments, such advertising may be related to the content and/or based on previously observed preferences of a user.

In some embodiments, data about a user's responses may be recorded, transmitted, tracked, monitored, and so on. For example, a reaction to a presentation may be monitored and reported to a server for use as marketing data. A reaction, for example, may include a biometric reaction recorded by a smartwatch and/or smartcar (e.g., change in temperature, change in movement rate, change in heart rate, etc.). A reaction may include a picture or video taken of a user through a front facing camera of a smart phone. Any information about a user may be monitored and used to determine a user's response to a presentation. That response may be indicative of a user's interest level in a promotion and may be used to further target advertising and/or other presentations to the user.

It should be recognized that various examples of actions that may be performed by users and/or monitoring of users are given as non-limiting examples only. Various embodiments may include some, all, none, different, and so on actions and/or monitoring features as desired.

Daredevil Across Times Square

Figure 8:
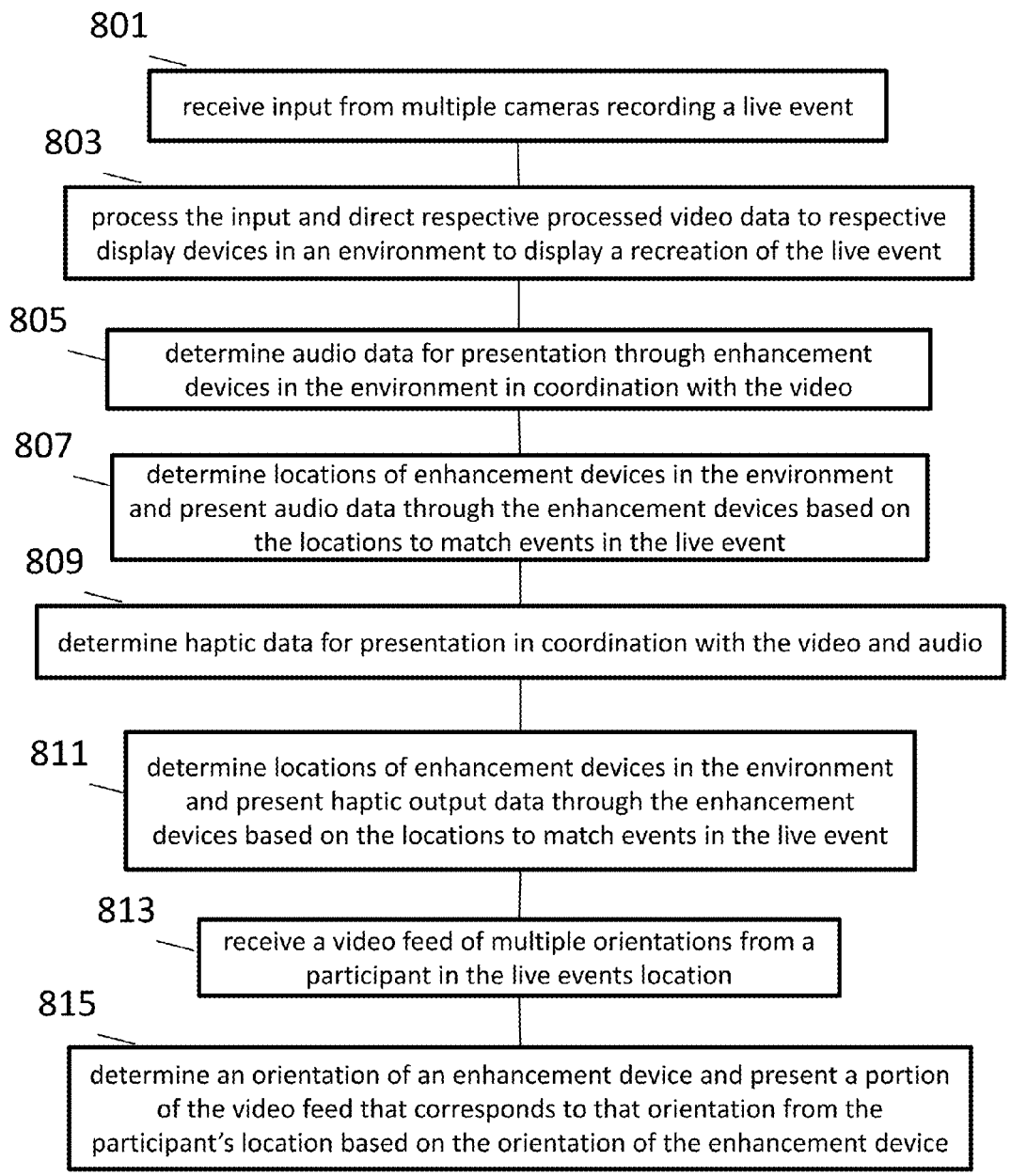
FIG. 8 illustrates an example method that may be performed in some embodiments.

In some embodiments, a live event may be presented in an environment through one or more display device proximate to the environment. The presentation may be made in coordination with enhancement presentations made through one or more enhancement devices proximate to the environment. As an example that illustrates some of the versatility that may be possible in some embodiments, a daredevil may plan a hire wire drive across a canyon that may be presented. FIG. 8 illustrates an example method that may be performed to present such an event.

In such an example, cameras may be placed along the high wire to capture the daredevil's fete. Billboards throughout Times Square may be used to present the daredevil's ride across the canyon. Camera placement may be configured to mimic the placement of billboards around Times Square. Each camera's input may be directed to a corresponding billboard in Times Square so that the visual appearance in Times Square is as if the bike is making the ride through the square.

As indicated at 801, a data source such as that shown in FIG. 1a or other device may receive input from the cameras. The data source or other device may direct the appropriate billboards to display the respective visual data as the biker makes his or her ride across the canyon. As indicated at 803, the data source may process the video and direct the processed video to respective billboards. The data source or other device may delay the presentation to the billboards to provide for caching or other syncing functionalities. The data source may encode the data to a format that enables proper syncing.

As indicated at 805, the data source or other device may determine audio data to be presented through smartphones for presentation in coordination with the video. The audio data may be actual data captured by a camera and/or simulated bike roaring sent to the data source from a controller of the presentation (e.g., a person, a program). A data source may send that information to a server for presentation to users. As indicated at 807, a server or other device may determine locations of users watching the presentation and present the audio data to the users based on that location. For example, as the biker moves from one side of the canyon and correspondingly Times Square, sound may be output of a bike engine roar that follows the biker across the way. As the biker is shown to move across the square on the displays that span the square so too may sound of the biker travel through the smartphones devices that communicate with the server move across the square.

As indicated at 809, the data source or other device may determine haptic data for presentation in coordination with the video and audio. The haptic data may be recorded by a camera and/or seismic device. The data may be simulated by a controller of a presentation. The data may be determined to match sound data and/or video data. A data source may send that data to a server for presentation to users. As indicated at 811, a server or other device may determine locations of users and present haptic output to users based on the locations. For example, as a biker moves from one side of the canyon and correspondingly Times Square, a vibration of a smartphone or smartwatch may follow the biker across the way. As users move closer to a display when the biker is shown close to a corresponding camera, the vibration may increase (e.g., in speed and/or intensity). As the biker is shown and heard to move across the square, the feeling of the engine's vibrations may be felt to also move across the square through smartphones and/or smartwatches communicating with the sever. Audio and haptic output may be through a same or different device, When a location determine is referenced, that location may be determined once (e.g., for single smartphone and used for both haptic and audio), and/or determined separately for each even if one or multiple devices are used. Audio and haptic output may be required to be presented together and/or may be presented individually as desired.

The biker may wear a 360 degree camera assembly on his or her helmet (or otherwise any number of cameras on any element associated with the crossing of the canyon such as an assembly that hangs below the biker or above the biker). As indicated at 813, input from that camera assembly may be received (e.g., by the data source), processed and sent to a server for possible presentation. A user using a smartphone may gain access to that visual data. For example, a user may hold a smartphone facing a direction and be shown visual data from the 360 degree camera mount that is facing in that direction. This may allow a user to simulate being the biker and looking around the canyon as the canyon is crossed. As indicated at 815, a server may determine a direction that the smartphone is facing and based on that direction may transmit a video feed from an appropriate input of the 360 degree camera mount to be presented to the smartphone. As the user moves the smart phone to face different directions, the video feed sent to the phone may be adjusted to match the new direction.

It should be recognized that this example is given as a non-limiting example only. This example illustrates some of the versatility and possibilities that may be possible in various embodiments. Other embodiment my include any of a variety of functionality and combinations of elements as desired.

Various non-limiting examples and/or embodiments have been described. Other embodiments may include some, none, all, different, similar, and so on features. Embodiments and/or examples may be combined in any manner. For example, a feature in one section of this application may be combined with one or more feature form another embodiment described in the application in any order or manner. No particular element or features is required in any embodiment. It should also be understood that while examples of some embodiments are given in terms of a single user observing a presentation, that embodiments may include any number of observers observing a presentation. The observers may be treated similarly and/or differently. For example, a thousand users may view of a presentation at Harmon Corner and each obtain audio output through a respective smartphone (e.g., using a method similar to that of FIG. 2).

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth®, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

X. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

The invention claimed is:

1. An apparatus comprising:
one or more computing devices; and one or more non-transitory mediums having stored thereon instructions that when executed by the one or more computing device cause the apparatus to:
receive presentation data defining a presentation to be made to one or more users in which receiving the data includes receiving a feed of data and providing an ongoing processing of the feed, in which the feed includes a live stream of data;
determine access data defining access parameters for one or more users to gain access to a portion of the presentation through mobile devices;
process the presentation data to arrange for audio data and video data to be transmitted to separate destinations, in which processing the presentation data includes separating the audio data and the video data in presentation data;
transmit video data to a publicly viewable display device;
transmit audio data to a server that is accessible by the mobile devices;
facilitate a communication exchange that provides the access data to the mobile devices, wherein the access data directs the mobile devices to connect to the server to access the audio data, in which the communication exchange is a near field communication transfer of the access data;
determine a respective location of each mobile device of the mobile devices and a respective audio presentation for each mobile device based on the respective location and the audio data; and
facilitate output of the presentation through a displaying of the video data by the publically viewable display device and a playing of a determined respective audio presentation through each mobile device, in which facilitating output includes transmitting packets of audio data to the mobile devices, in which the packets of audio data include time stamps indicating a time when a portion of audio should be played by the mobile devices, in which the packets of audio data include an indication of a length of time for playing a portion of audio.

2. The apparatus of claim 1, in which transmitting the video data to the publicly viewable display device includes transmitting the video data to a content controller that controls video output on the publicly viewable display device.

3. The apparatus of claim 1, in which processing the presentation data include identifying a respective destination for each of the audio data and the video data.

4. The apparatus of claim 1, in which processing the data includes adding timing information to the audio data and scheduling information to the video data, in which the timing information is configured to synchronize the output of the audio data with the output of the video data defined by the scheduling information.

5. The apparatus of claim 1, in which facilitating the communication exchange includes transmitting the access data to a plurality of devices configured to engage in the near field communication transfer with the mobile devices.

6. The apparatus of claim 1, in which facilitating output of the presentation includes making a time synchronized output of the audio data and the video data through the publicly viewable display device and the mobile devices.

7. The apparatus of claim 1, in which the publicly viewable display device is a billboard.

8. The apparatus of claim 1, in which the mobile devices are smartphones.

9. The apparatus of claim 1, in which the access data is a Universal Resource Locator that identifies the server.

10. The apparatus of claim 1, in which receiving the presentation data includes receiving an indication of a variation in a manner of presenting the audio data based on location of a mobile device.

11. A method comprising:
receiving, by a computing device, presentation data defining a presentation to be made to one or more users;
receiving, by the computing device, access data defining access parameters for one or more users to gain access to a portion of the presentation through mobile devices in which receiving the data includes receiving a feed of data and providing an ongoing processing of the feed, in which the feed includes a live stream of data;
processing, by the computing device, the presentation data to arrange for audio data and video data to be transmitted to separate destinations, in which processing the presentation data includes separating the audio data and the video data in presentation data;
transmitting, by the computing device, video data to a publicly viewable display device;
transmitting, by the computing device, audio data to a server that is accessible by the mobile devices;
facilitating, by the computing device, a communication exchange that provides the access data to the mobile devices, wherein the access data directs the mobile devices to connect to the server to access the audio data, in which the communication exchange is a near field communication transfer of the access data;
determine a respective location of each mobile device of the mobile devices and a respective audio presentation for each mobile device based on the respective location and the audio data; and
facilitating, by the computing device, output of the presentation through a displaying of the video data by the publically viewable display device and a playing of a determined respective audio presentation through each mobile device, in which facilitating output includes transmitting packets of audio data to the mobile devices, in which the packets of audio data include time stamps indicating a time when a portion of audio should be played by the mobile devices, in which the packets of audio data include an indication of a length of time for playing a portion of audio.

* * * * *